(12) United States Patent
Dewilde

(10) Patent No.: US 9,665,742 B2
(45) Date of Patent: May 30, 2017

(54) COMPUTER SECURITY SYSTEM HAVING INTEGRATED GPS

(71) Applicant: International Business Machines Corporation, Armonk, NY (US)

(72) Inventor: Frederick C. Dewilde, Lafayette, CO (US)

(73) Assignee: International Business Machines Corporation, Armonk, NY (US)

( * ) Notice: Subject to any disclaimer, the term of this patent is extended or adjusted under 35 U.S.C. 154(b) by 41 days.

(21) Appl. No.: 13/943,741

(22) Filed: Jul. 16, 2013

(65) Prior Publication Data
US 2013/0305395 A1 Nov. 14, 2013

Related U.S. Application Data

(63) Continuation of application No. 12/565,506, filed on Sep. 23, 2009, now abandoned.

(51) Int. Cl.
*G08B 1/08* (2006.01)
*G06F 21/88* (2013.01)
*G06F 21/80* (2013.01)

(52) U.S. Cl.
CPC .............. *G06F 21/88* (2013.01); *G06F 21/80* (2013.01); *G06F 2221/2111* (2013.01); *G06F 2221/2143* (2013.01)

(58) Field of Classification Search
None
See application file for complete search history.

(56) References Cited

U.S. PATENT DOCUMENTS

| 5,748,084 A | 5/1998 | Isikoff |
| 5,790,074 A | 8/1998 | Rangedahl et al. |
| 6,166,688 A * | 12/2000 | Cromer ................ G06F 21/575 340/10.1 |
| 6,362,736 B1 | 3/2002 | Gehlot |
| 6,889,135 B2 | 5/2005 | Curatolo et al. |
| 6,995,667 B2 | 2/2006 | He et al. |
| 7,151,950 B1 | 12/2006 | Oyang et al. |
| 2005/0149752 A1 | 7/2005 | Johnson et al. |
| 2005/0221841 A1 | 10/2005 | Piccionelli et al. |
| 2005/0246098 A1* | 11/2005 | Bergstrom et al. ........... 701/213 |

(Continued)

OTHER PUBLICATIONS

Gasior, Geoff, How to build a PC a step-by-step guide to enthusiast system assembly, Nov. 29, 2007.*

(Continued)

*Primary Examiner* — Brian Zimmerman
*Assistant Examiner* — Kevin Lau
(74) *Attorney, Agent, or Firm* — Schmeiser, Olsen & Watts, LLP; Michael Petrocelli

(57) ABSTRACT

A computing apparatus having a hard drive storage unit which includes a global positioning system, a non-volatile memory and a compare module. The non-volatile memory stores a permitted zone of operation of the hard drive storage unit while the compare module monitors the current location. If the compare module detects a current location of the hard drive storage unit as tracked by the global positioning system which is outside of the permitted zone of operation as stored in the non-volatile memory, the non-volatile memory contains at least one command implemented by a computer processor that may cause the hard drive storage unit to become disabled.

15 Claims, 5 Drawing Sheets

(56) References Cited

U.S. PATENT DOCUMENTS

| | | | |
|---|---|---|---|
| 2006/0075487 A1* | 4/2006 | Pfleging et al. | 726/21 |
| 2006/0112418 A1* | 5/2006 | Bantz | G06F 21/88 726/4 |
| 2006/0148465 A1* | 7/2006 | Perdomo | H04W 48/02 455/422.1 |
| 2006/0195709 A1* | 8/2006 | Matsumoto | 713/300 |
| 2006/0278701 A1* | 12/2006 | Matsushita et al. | 235/382 |
| 2007/0192869 A1* | 8/2007 | Garfinkle | 726/26 |
| 2008/0004039 A1 | 1/2008 | Ober et al. | |
| 2008/0055154 A1* | 3/2008 | Martucci | G01S 5/0027 342/357.55 |
| 2008/0088438 A1 | 4/2008 | Aninye et al. | |
| 2008/0186184 A1* | 8/2008 | August et al. | 340/572.7 |
| 2009/0009283 A1 | 1/2009 | Arts | |
| 2009/0253408 A1* | 10/2009 | Fitzgerald | G06F 21/316 455/411 |
| 2010/0323714 A1* | 12/2010 | Schmidt | H04W 48/18 455/456.1 |
| 2011/0072523 A1 | 3/2011 | Dewilde | |

OTHER PUBLICATIONS

Non-Final Office Action dated Nov. 16, 2012 for U.S. Appl. No. 12/565,506.

Final Office Action dated Apr. 17, 2013 for U.S. Appl. No. 12/565,506.

"How Much Risk Can You Accept?" dated Jul. 28, 2013. http://www.realtime-itcompliance.com/information_security/2006/10/gps_tracking_urged_as_a_laptop.htm (Printed Oct. 22, 2014).

"SafeRegistry: Login," http://www.mylaptopgps.com/ or http://www.mylaptopgps.com/main_video.php or http://safebeacongps.com/how.php (Printed Oct. 22, 2014).

"Earthmate GPS—DeLorme", http://shop.delorme.com/OA_HTML/DELibeCCtpSctDspRte.jsp?section=10043 (Printed Oct. 22, 2014).

* cited by examiner

COMPUTER SECURITY SYSTEM HAVING INTEGRATED GPS

CROSS REFERENCE TO RELATED APPLICATION

This application is a Continuation application of U.S. Ser. No. 12/565,506, filed Sep. 23, 2009, now Abandoned.

FIELD OF THE INVENTION

The present invention relates in general to computer systems and, in particular, to a computer system and method for disabling a hard drive storage unit in a computer when the hard drive storage unit is outside an authorized, geographical area utilizing a global positioning system device.

BACKGROUND OF THE INVENTION

Personal computer systems are well known in the art. They have attained widespread use for providing computer power to many segments of today's modern society. Personal computers (PCs) may be defined as a desktop, server, floor standing, portable or laptop computer that may include a system unit having at least one central processing unit (CPU) and associated volatile and non-volatile memory, including random access memory (RAM) and basic input/output system read only memory (BIOS ROM), a system monitor, a keyboard, a CD/DVD drive, a fixed disk storage drive (also known as a "hard drive"), a pointing device such as, a mouse, and an optional network interface adapter. These systems may include the use of a motherboard to electrically connect these components together.

Computers are one of the most stolen electronic devices on the market today. After being stolen, a portable computer is typically removed from its area of use and resold in another area. This prevents local police from easily recovering the computer.

Once a computer is stolen or otherwise removed from its area of use, data from the hard drive may be accessed. Previous attempts at security have been aimed at protecting the computer. However, the really valuable part of the computer may be the data stored on the hard drive and the previous attempts at security do not appear to address the security of the hard drive.

BRIEF SUMMARY OF THE INVENTION

The present invention proposes an apparatus and method for protecting the data stored on a hard drive should the hard drive, or a computer system incorporating the hard drive, be moved outside a permitted zone of operation by disabling the hard drive.

The various advantages and purposes of the present invention as described above and hereafter are achieved by providing, according to a first aspect of the invention, a hard drive storage unit apparatus including a hard drive storage unit for a computer, a housing for the hard drive storage unit, a non-volatile memory within the housing to store data regarding a permitted location of the hard drive storage unit, a global positioning system (GPS) unit within the housing to track a current location of the hard drive storage unit, and a compare module to monitor any change between the permitted location and current location of the hard drive storage unit.

According to a second aspect of the invention, there is provided a computing apparatus including a computing apparatus housing, a central processing unit within the computing apparatus housing, and a hard drive storage unit apparatus within the computing apparatus housing including a hard drive storage unit, a housing for the hard drive storage unit, a non-volatile memory within the hard drive storage unit housing to store data regarding a permitted location of the hard drive storage unit, a global positioning system (GPS) unit within the hard drive storage unit housing to track the current location of the hard drive storage unit, and a compare module to monitor any change between the permitted location and current location of the hard drive storage unit.

According to a third aspect of the invention, there is provided a method of securing a hard drive storage unit in a computer, the hard drive storage unit having a housing for the hard drive storage unit, a non-volatile memory within the housing to store data regarding a predetermined zone of operation of the hard drive storage unit, a computer processor, a compare module to monitor any change between the permitted location and a current location, and a global positioning system (GPS) unit within the housing to track the current location of the hard drive storage unit, the method including registering the GPS unit by a computer processor with an instrumentality upon initial power up of the hard drive storage unit, defining by a user a predetermined zone of operation, storing by a computer processor the predetermined zone of operation in the non-volatile memory, storing by a computer processor a command in the non-volatile memory to disable the hard drive storage unit, determining by the GPS unit a current location of the hard drive storage unit, referencing by the compare module the predetermined zone of operation stored by the non-volatile memory and determining if the current location of the hard drive storage unit is within the predetermined zone of operation, controlling power to the hard drive storage unit by the computer processor and wherein power is supplied to the hard drive storage unit if the hard drive storage unit is within the predetermined zone of operation and power is not supplied to the hard drive storage unit if the hard drive storage unit is outside of the predetermined zone of operation, and receiving an instruction by a computer processor from the instrumentality to implement the command to format the hard drive storage unit.

According to a fourth aspect of the invention, there is provided a method of securing a hard drive storage unit in a computer, the hard drive storage unit having a housing for the hard drive storage unit, a non-volatile memory within the housing to store data regarding a predetermined zone of operation of the hard drive storage unit, a compare module to monitor any change between the predetermined zone of operation and a current location and a global positioning system (GPS) unit within the housing to track the current location of the hard drive storage unit, the method including storing by a computer processor a predetermined zone of operation in the non-volatile memory, referencing by the compare module the predetermined zone of operation stored in the non-volatile memory, determining by the compare module if the current location of the hard drive storage unit is within the predetermined zone of operation, and disabling by a computer processor the hard drive storage unit if the hard drive storage unit is outside of the predetermined zone of operation.

BRIEF DESCRIPTION OF THE DRAWINGS

The features of the invention believed to be novel and the elements characteristic of the invention are set forth with particularity in the appended claims. The Figures are for illustration purposes only and are not drawn to scale. The invention itself, however, both as to organization and method of operation, may best be understood by reference to the detailed description which follows taken in conjunction with the accompanying drawings in which:

DETAILED DESCRIPTION OF THE INVENTION

Figure 1:
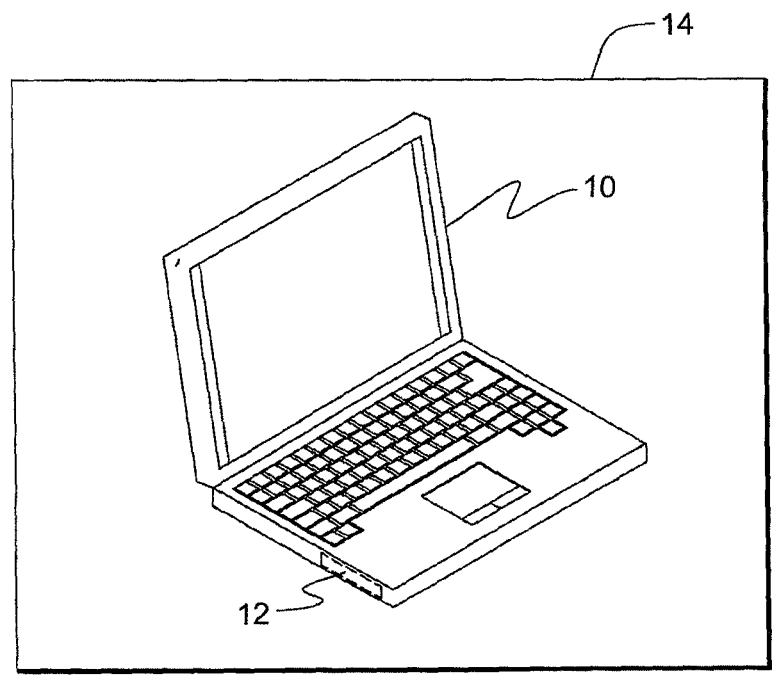
FIG. 1 illustrates a schematic representation of a computer system including a hard drive operating in a permitted zone of operation.

Referring to the Figures in more detail. and particularly referring to FIG. 1, there is shown a computer system 10 having a hard drive 12. Computer system and computer are used interchangeably herein. Such a hard drive 12 is a ubiquitous and well known part of the computer and may include, for purposes of illustration and not limitation, fixed disk hard drives as well as flash drives in netbook minicomputers. The computer 10 may be any of the computers mentioned above but the present invention has particular application to laptops because of their versatile portability. Also indicated in FIG. 1 is a permitted zone of operation 14 where the computer 10 frequently operates. The permitted zone of operation may be an office, cubicle, building, home office or other area as defined by the owner or authorized user (collectively referred to as owner) of the computer 10. It is within the scope of the present invention to have multiple permitted zones of operation such as a cubicle in an office building and a home office.

Figure 2:
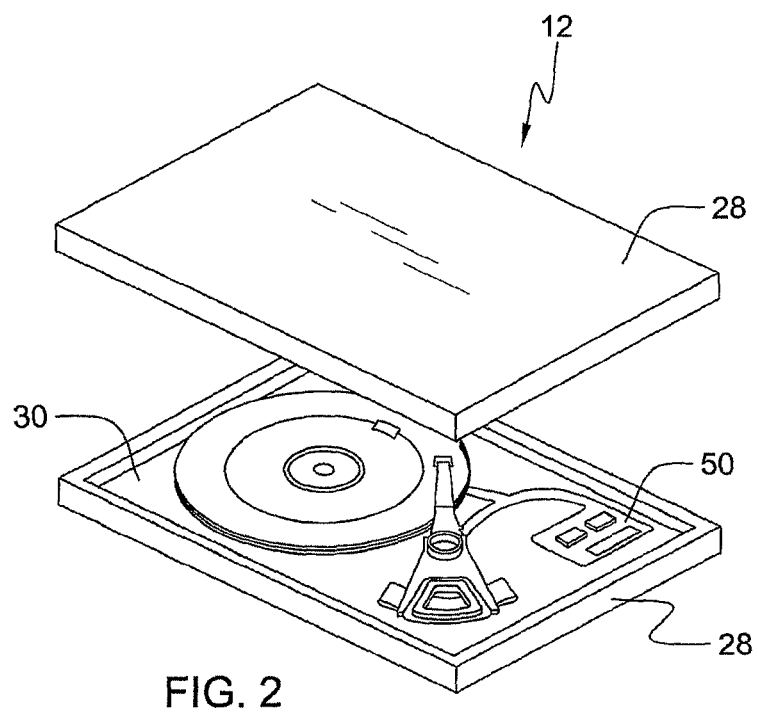
FIG. 2 is a pictorial representation of a hard drive.

Referring now to FIG. 2, there is shown a pictorial representation of a hard drive 12. Any type of hard drive 12 may be suitable for practicing the present invention. The hard drive 12 shown in FIG. 2 is merely representative of a hard drive 12 that may be used in practicing the present invention and is shown for purposes of illustration and not limitation. Hard drive 12 includes a hard drive unit 30 contained within a housing 28 which may be in one or more parts. Also shown in FIG. 2 is a printed circuit assembly 50 which may contain the various components that make up the electronic circuitry that runs the hard drive 12.

Figure 3:
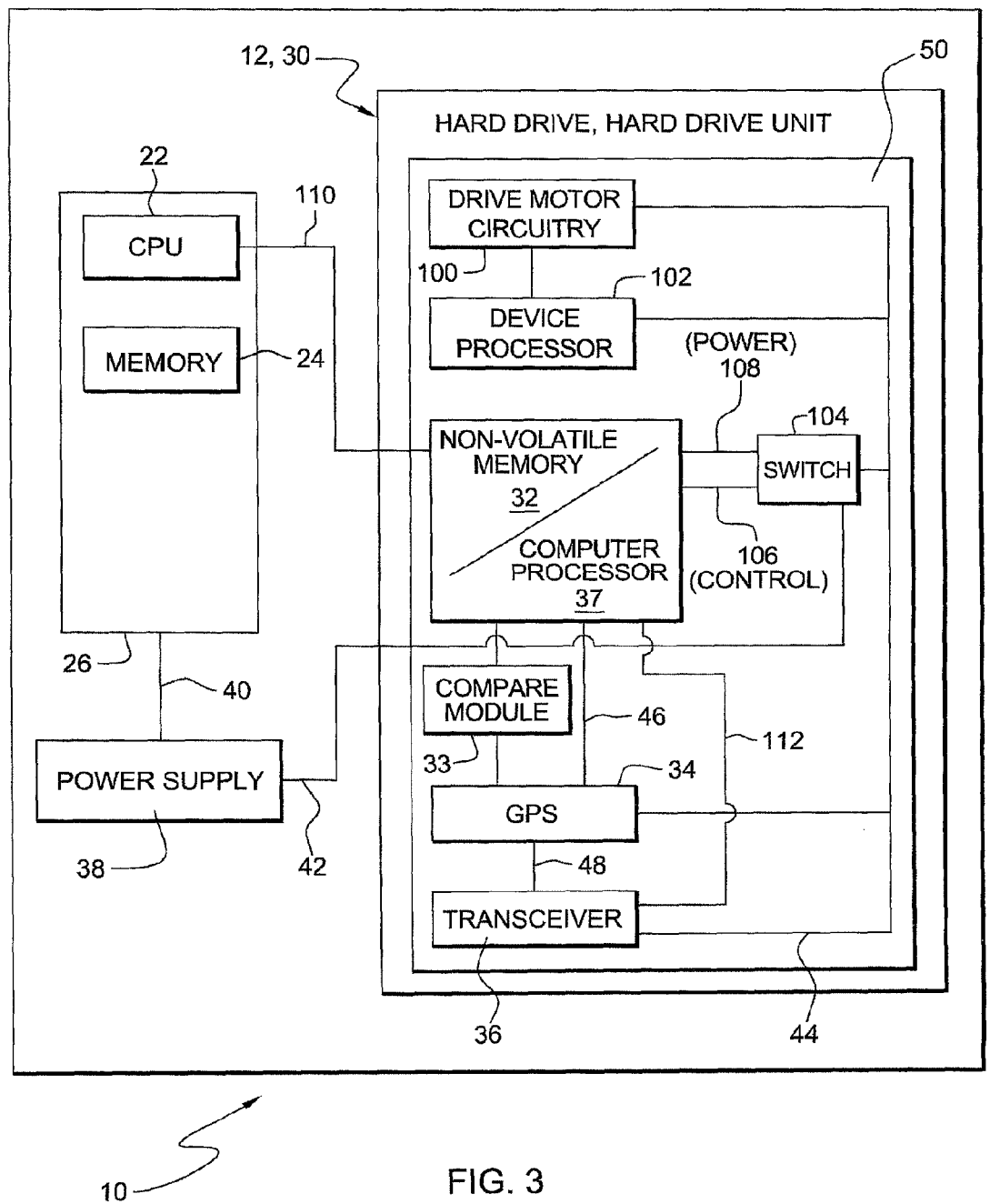
FIG. 3 illustrates a schematic representation of a computer system including a hard drive according to the apparatus and method of the present invention.

Referring now to FIG. 3, a detailed schematic representation of the computer system 10 of the present invention is illustrated. Computer system 10 typically includes one or more central processing units (only one such central processing unit (CPU) 22 is shown in FIG. 2), memory 24 and other components not important to the present important. The CPU 22, memory 24 and other components may be mounted on a mother board 26 as is conventional.

Still referring to FIG. 3, the circuitry that runs the hard drive 12 shown in FIG. 2 is shown in more detail. The hard drive 12 and hard drive unit 30 are shown schematically as box 12, 30. The electronic circuitry are conveniently shown as located on printed circuit assembly 50 but they do not need to be as some components may be directly attached to the hard drive unit 30. The hard drive 12 may contain conventional components such as drive motor circuitry 100 and device processor 102. The circuitry further includes non-volatile memory 32, global positioning system (GPS) 34 and compare module 33.

The non-volatile memory 32 may be selected from the group consisting of electrically erasable programmable read only memory (EEPROM), flash memory, non-volatile random access memory (NVRAM) and magnetosensitive random access memory (MRAM). The non-volatile memory is essentially used herein as a controller that may store firmware commands with respect to the operation or disabling of the hard drive 12, as will be explained in more detail hereafter. The non-volatile memory 32 may be any memory device, including those listed above, that is capable of storing firmware commands.

In one embodiment of the present invention, the firmware commands from non-volatile memory 32 may be executed by a computer processor 37. The non-volatile memory 32 and computer processor 37 may be separate components connected by appropriate wiring or, as shown in FIG. 3, the non-volatile memory 32 and computer processor 37 may be manufactured as a single component having the dual functionality of a non-volatile memory and a computer processor. It is envisioned that computer processor 37 is a relatively simple computer processor and need not be as complex as a CPU. In another embodiment of the present invention, non-volatile memory 32 and computer processor 37 may be replaced by a microcontroller provided that the microcontroller has a non-volatile memory component.

In one preferred embodiment, the hard drive circuitry includes a transceiver 36 for communicating a location of the hard drive unit 30 to the outside world. In another preferred embodiment, the hard drive unit 30, non-volatile memory 32, computer processor 37, GPS 34, compare module 33 and preferred transceiver 36 are located within the housing 28 of the hard drive 12. In a further preferred embodiment, the nonvolatile memory 32, computer processor 37, GPS 34, compare module 33 and preferred transceiver 36 are mounted on the printed circuit assembly 50 which may also include the hard drive unit 30. The combination of hard drive unit 30, non-volatile memory 32, computer processor 37, GPS 34, compare module 33 and preferred transceiver 36 may form an integrated hard drive assembly contained within housing 28. Hard drive 12 hereafter may be referred to as hard drive or hard drive storage unit and both of such terms are understood to be equivalent.

Still referring to FIG. 3, the computer 10 includes a power supply 38 which supplies system power to the CPU 22, memory 22 and other components not shown as well as hard drive 12. In one embodiment, the system power is supplied to motherboard 26 through circuitry 40. The hard drive 12 may also be mounted on system board 26 although this is not required. Instead, hard drive 12 may be mounted on a card which is in turn mounted on motherboard 26. In either case, power is supplied to hard drive 12 through switch 104 (for example, a logical gate) as indicated by circuitry 42. Switch 104 is connected to non-volatile memory 32 and computer processor 37 by wiring 106. Switch 104 is controlled by computer processor 37 through wiring 106. Power is supplied to non-volatile memory 32 and computer processor 37 though bus 108 from switch 104. While power is fed to non-volatile memory 32 and computer processor 37 from switch 104, the power is always "on" and not subject to being switched by switch 104. The hard drive 12 may have a power bus 44 by which power is distributed from switch 104 to the hard drive unit 30, GPS 34 and preferred transceiver 36. In addition, non-volatile memory 32 and computer processor 37 may communicate with GPS 34 by bus 46 and with transceiver 36 by bus 112 while GPS 34 and transceiver 36 may communicate by bus 48. The hard drive 12 further comprises the compare module 33 for comparing the permitted zone of operation as stored in the non-volatile memory 32 with the current location of the hard drive 12 as tracked by GPS unit 34. Compare module 33 may be implemented in hardware, software or firmware and may be separate from non-volatile memory 32, computer processor 37 and GPS unit 34. It is also within the scope of the present invention for compare module 33 to form a part of the non-volatile memory 32, computer processor 37 or GPS unit 34.

Figure 4:
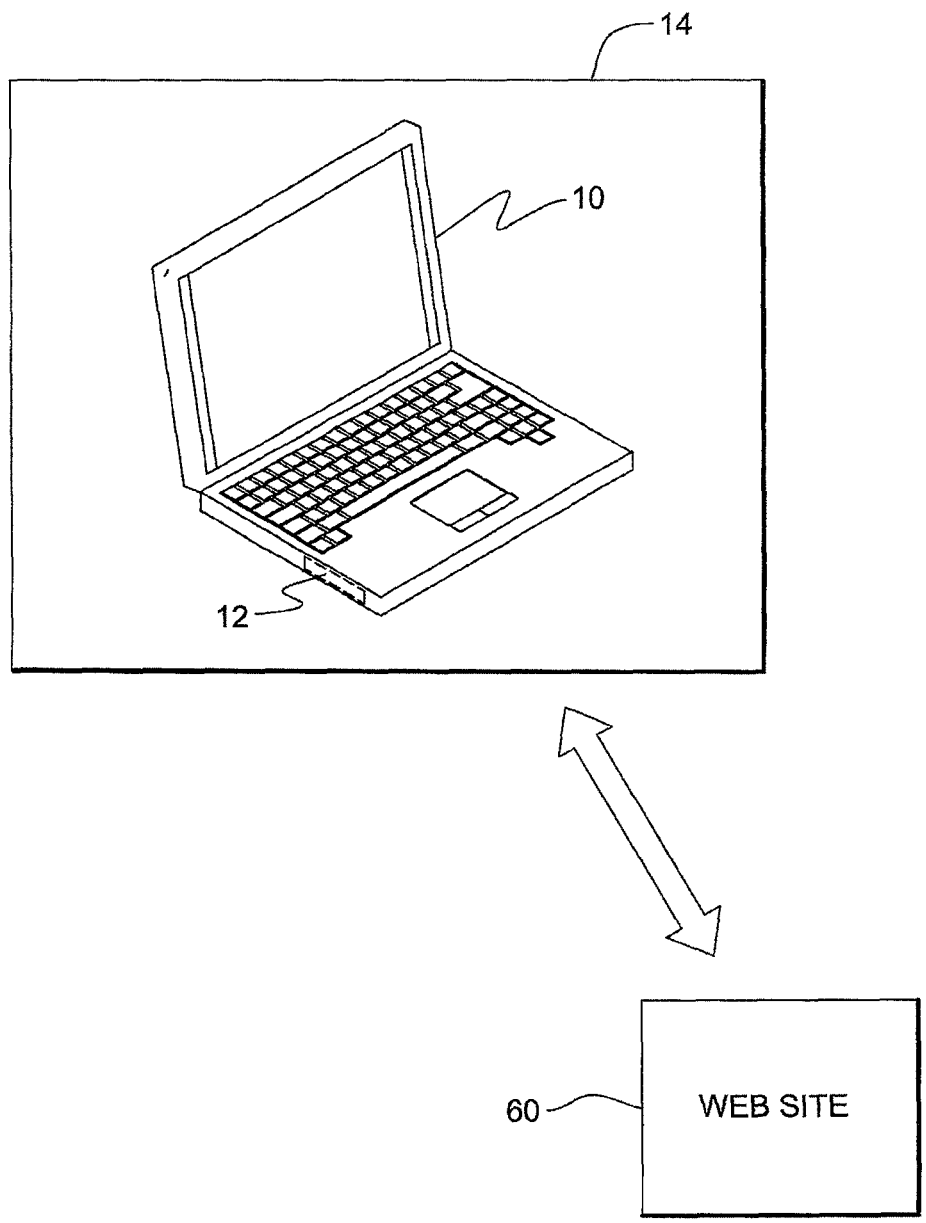
FIGS. 4 to 7 illustrate a method according to the present invention.

Referring now to FIGS. 4 to 7, the operation of a preferred embodiment of the present invention will be discussed. Referring first to FIG. 4, computer 10 having hard drive 12 is located in a zone of operation 14 which has been determined by the owner of the computer 10 to be permitted. The computer 10 may communicate through transceiver 36 with a service at an instrumentality such as a web site 60 which handles managing of user accounts, billing, defining safe zones, registering of the GPS 34, notifications from computer 10, preferences of the owner of the computer 10 and other services to be explained hereafter. The web site 60 upon receiving input from the owner may also place the computer 10 and hard drive 12 in travel and/or repair mode if desired.

Figure 5:
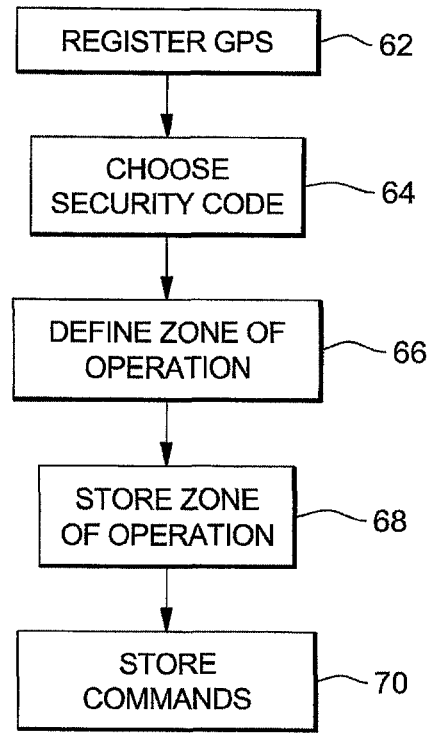

Referring now to FIG. 5, the method of the invention is described. In step 62, computer 10 registers GPS 34 with a service at an instrumentality such as web site 60 using a unique serial number or identifier of the hard drive 12. In step 64, the owner chooses a security code which will be needed for verification purposes should the hard drive 12 be removed from the permitted zone of operation 14 and the computer 10 receives the security code as input from the owner. In step 66, a permitted zone of operation where the computer 10 and hard drive 12 will be operated is defined. The permitted zone of operation may be defined via the web site 60, directly inputted from the GPS unit 34 or from an online mapping service (such as Googlemaps) where GPS coordinates can be obtained using input supplied by the owner. In step 68, the nonvolatile memory 32 stores the permitted zone of operation. In step 70, the nonvolatile memory 32 may also store certain commands, such as a "format c:\" command or a disabling BIOS command that may disable the hard drive 12 as will be explained hereafter.

Figure 6:
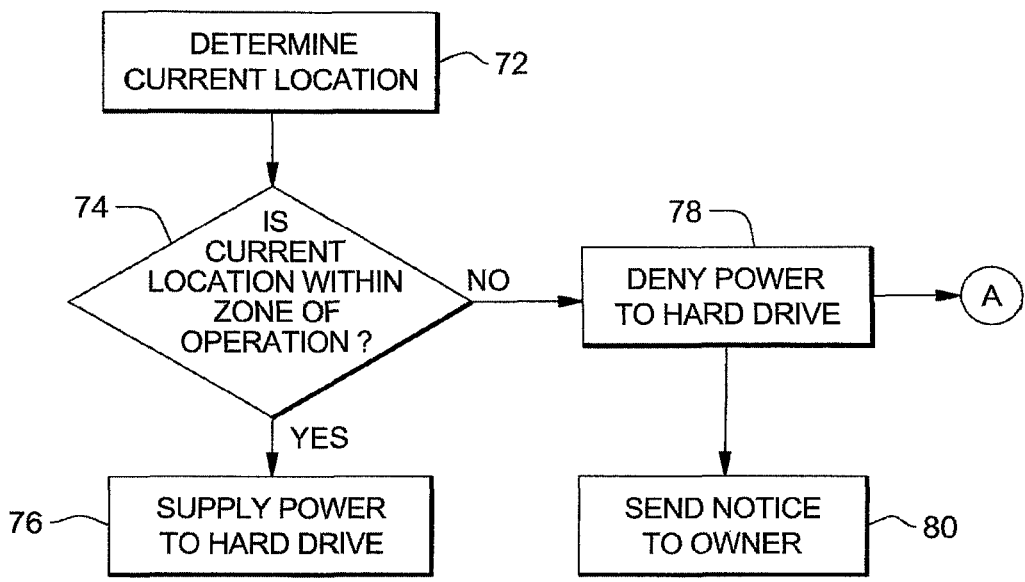

Referring now to FIG. 6, additional steps of the method will be described. In step 72, the GPS unit 34 determines the current location of the hard drive 12.

At this point in the process, in step 74, the compare module 33 references the permitted zone of operation 14 as stored in the non-volatile memory 32 and determines if the current location of the hard drive 12 is within the permitted zone of operation. If the determination is made that the hard drive 12 is within the permitted zone of operation 14, this determination may be stored in non-volatile memory 32, then in step 76, computer processor 37 causes switch 104 to supply power to the hard drive 12. If the determination is made that the hard drive 12 is outside the permitted zone of operation 14, this determination may be stored in non-volatile memory 32, then in step 78, computer processor 37 causes switch 104 to deny power to the hard drive 12, effectively disabling the computer 10. There may also be a pop-up window with a warning that the computer or hard drive will be disabled because it is leaving the permitted zone of operation. In step 80, the computer 10 or the instrumentality such as the web site 60 may also send a notification to the owner.

Figure 7:
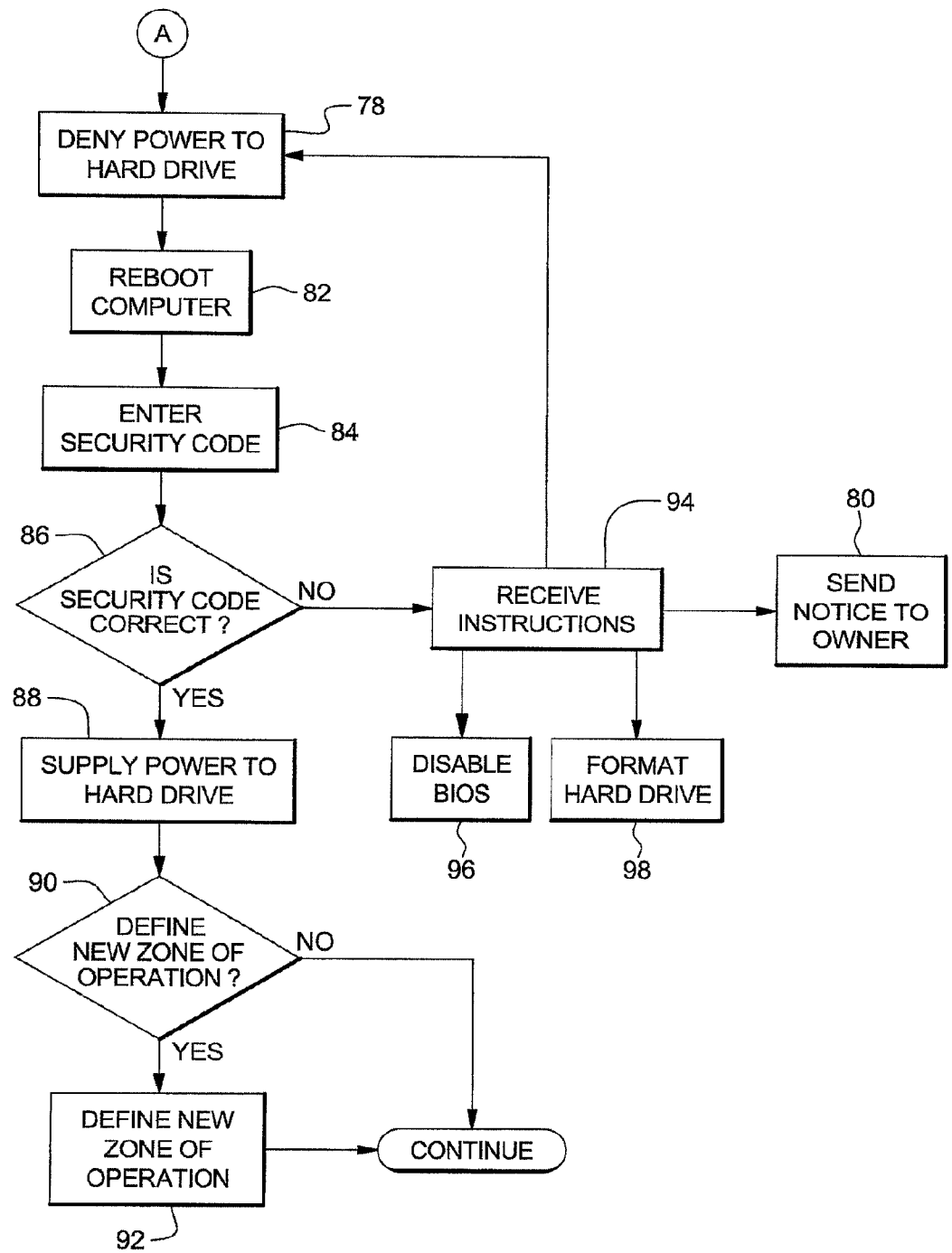

Referring now to FIG. 7, the process continues with denying power to the hard drive 12, as previously indicated by step 78. In step 82, the person in possession of the computer 10 (who may be the owner or an unauthorized person) reboots the computer. After the computer 10 has been rebooted, in step 84, the person in possession of the computer 10 enters in the computer 10 the security code which was first entered in the computer 10 in step 64, FIG. 5. In step 86, the software at the web site 60 determines if the security code is correct, and if so, web site 60 may communicate this determination to non-volatile memory 32 via transceiver 36 and bus 112 and then in step 88, the computer processor 37 may cause switch 104 to supply power to the hard drive 12. Since power was initially denied due to the hard drive 12 leaving its permitted zone of operation, a further step in the process could be step 90 wherein the computer 10 queries the owner to define a new zone of operation, and if the answer is "yes", then a further step may be step 92, wherein a new zone of operation is defined in computer 10 using owner input, which could also include choosing a new security code.

If, in step 86, the security code is incorrect or if no security code is entered in computer 10, the service at web site 60, in step 94, looks to its user preferences for further instructions. There may also be a further notification to the owner by the web site 60, step 80, or a pop-up window may open with a warning that the computer or hard drive will be disabled because it is leaving the permitted zone of operation. When the service at web site 60 looks to its user preferences for further instructions, step 94, these instructions may be stored at the web site 60 or the web site 60 may inquire of the owner for these further instructions. The further instructions could include several different options for disabling the computer 10 or hard drive 12. One option could simply be to default to step 78, in which power is denied to the hard drive and cause the computer processor 37 to issue a command (which may be previously stored in non-volatile memory 32) to shut down the hard drive and therefore the computer 10. The user may try to reboot and since the user does not have the security code, the computer 10 would be shut down again. This scenario may proceed until the user gives up, thus preserving the data on the hard drive. Another option is to have the computer processor 37 in step 96 issue a command (which may be previously stored in non-volatile memory 32) to the BIOS (Basic Input/Output System) through circuitry 110 (FIG. 3) to remove the hard drive from the BIOS. This would have the effect of also shutting down the computer. If the owner recovers the computer, the BIOS may be fixed so that the computer becomes operable again. A further option, in step 98, is to format the hard drive by the web site 60 or possibly the computer processor 37 issuing a "format CA" command (which may be previously stored in non-volatile memory 32) if the security code is incorrectly entered a predetermined number of times. This is a drastic option but it may be necessary to protect very sensitive data.

As noted previously, power is controlled to the hard drive 12 by computer processor 37 and switch 104. If the hard drive 12 is within the permitted zone of operation, the computer processor 37 may permit the system BIOS to boot normally. If the hard drive 12 is outside of the permitted zone of operation, or is moved from within the permitted zone of operation to outside the permitted zone of operation, the computer processor 37 may cause switch 104 to cut power to the hard drive 12, the BIOS may shut down the computer 10 and an alert may be sent by transceiver 36 to the web site 60. The non-volatile memory 32 may then enter "security mode" and unless the corresponding security code was transmitted to the web site 60 the next time the computer 10 was powered on, the computer processor 37 may issue a command as discussed above while disabling the power to the hard drive 12, rendering the entire unit useless.

The process could be modified in the user preferences at web site 60 such that the instructions to the non-volatile memory 32 and computer processor 37, or perhaps just the most harsh instructions such as the hard drive format command, would be sent only with written permission from the computer owner via the web site 60 and can only be initiated by the service at the web site 60 utilizing the unique serial number or identifier of the hard drive 12 previously used for registration along with an encrypted signal.

The service at web site 60 may make use of Googlemaps or a similar service so that for a fee, the computer owner could track their computer and hard drive in real time anywhere in the world.

While a preferred embodiment of the present invention is to have transceiver 36 for communicating with the web site 60, the present invention may be advantageous even without transceiver 36. That is, some user preferences could be embodied in the non-volatile memory 32. For example, the non-volatile memory 32 and computer processor 37 could be programmed so that upon transporting of the hard drive 12 out of the permitted zone of operation 14, power to the hard drive 12 may be shut off by switch 104. Upon rebooting of the computer 10 and hard drive 12, a security word may be requested and after some number of tries, the computer processor 37 would fail to provide a necessary instruction for the BIOS to boot the computer, thereby disabling the computer 10. The owner of the computer 10, after recovering the computer 10, could reboot, enter the correct security code into computer 10 and thus re-enable the computer 10. As a drastic solution, there could be an instruction in the non-volatile memory to direct the computer processor 37 to simply format the hard drive after some number of incorrect entries of the security word.

It will be apparent to those skilled in the art having regard to this disclosure that other modifications of this invention beyond those embodiments specifically described here may be made without departing from the spirit of the invention. Accordingly, such modifications are considered within the scope of the invention as limited solely by the appended claims.

What is claimed is:

1. A secured external computer storage device attached to a portable computer, comprising:
   a portable hard drive,
   a circuit board onto which is mounted a dual-function component consisting of a magnetosensitive random access memory (MRAM) and a microcontroller,
   a wireless transceiver capable of bidirectional communications between the microcontroller and a processor hosting a Web site, where the Web site is configured to perform a method for securing the portable hard drive,
   a GPS capable of identifying whether hardware components of the storage device are physically located in a permitted building, and
   firmware stored in the MRAM comprising instructions for securing the portable hard drive, and
   a switching mechanism that controls distribution of power to components of the storage device, where the switching mechanism is capable of only three disabling operations: disabling power to only the circuit board, disabling power only to all components of the storage device other than the circuit board, and disabling power to all components of the storage device, the method comprising:
   the processor of the Web site receiving, through the transceiver, a notification that the GPS has determined that the portable hard drive is no longer in the permitted building;
   the processor, in response to the receiving, notifying a user of the portable computer that the portable hard drive is no longer in the permitted building; and
   the processor, in response to determining that the portable hard drive remains outside the permitted building after the notifying, instructing the microcontroller to perform the following sequence of operations: disabling power, by means of the switching mechanism, to the hard drive but not to the dual-function component; directing the portable computer to reboot and request a security code; and, upon a failure to receive a desired security code, removing the device from a BIOS of the portable computer without restoring power to the portable hard drive and without purging data from the portable hard drive.

2. The storage device of claim 1, where the method further comprises:
   the processor, receiving a security code from the user in response to the notifying;
   the processor, determining that the received security code is acceptable;
   the processor identifying that the portable hard drive is in the permitted building;
   the processor instructing the switching mechanism, through the transceiver, to restore power to the dual-purpose component; and
   the processor instructing the microcontroller to add the portable hard drive to the BIOS.

3. The storage device of claim 1, where the method further comprises:
   the processor, receiving a security code from the user in response to the notifying;
   the processor, determining that the received security code is acceptable;
   the processor identifying that the portable hard drive remains outside the permitted building;
   the processor instructing the switching mechanism, through the transceiver, to restore power to the dual-purpose component;
   the processor instructing the microcontroller to add the portable hard drive to the BIOS; and
   the processor reconfiguring the firmware in the MRAM to reclassify the current location of the hard drive to be the permitted building.

4. The storage device of claim 1, where the method further comprises:
   the processor, receiving a security code from the user in response to the notifying;
   the processor, determining that the received security code is not acceptable;
   the processor identifying that the portable hard drive remains outside the permitted building;
   the processor instructing the switching mechanism, through the transceiver, to restore power to the dual-purpose component;
   the processor instructing the microcontroller to remove power from the portable hard drive.

5. The storage device of claim 1, where the method further comprises:
   the processor, receiving a security code from the user in response to the notifying;
   the processor, determining that the received security code is not acceptable;

the processor identifying that the portable hard drive remains outside the permitted building;

the processor instructing the switching mechanism, through the transceiver, to restore power to the dual-purpose component;

the processor instructing the microcontroller to purge data stored on the portable hard drive.

6. A method for securing a secured external computer storage device attached to a portable computer, where the storage device comprises:

a portable hard drive, a circuit board onto which is mounted a dual-function component consisting of a magnetosensitive random access memory (MRAM) and a microcontroller, a wireless transceiver capable of bidirectional communications between the microcontroller and a processor hosting a Web site, where the Web site is configured to perform a method for securing the portable hard drive, a GPS capable of identifying whether hardware components of the storage device are physically located in a permitted building, and firmware stored in the MRAM comprising instructions for securing the portable hard drive, and a switching mechanism that controls distribution of power to components of the storage device, where the switching mechanism is capable of only three disabling operations: disabling power to only the circuit board, disabling power only to all components of the storage device other than the circuit board, and disabling power to all components of the storage device, the method comprising:

the processor of the Web site receiving, through the transceiver, a notification that the GPS has determined that the portable hard drive is no longer in the permitted building;

the processor, in response to the receiving, notifying a user of the portable computer that the portable hard drive is no longer in the permitted building; and the processor, in response to determining that the portable hard drive remains outside the permitted building after the notifying, instructing the microcontroller to perform the following sequence of operations: disabling power, by means of the switching mechanism, to the hard drive but not to the dual-function component; directing the portable computer to reboot and request a security code; and, upon a failure to receive a desired security code, removing the device from a BIOS of the portable computer without restoring power to the portable hard drive and without purging data from the portable hard drive.

7. The method of claim 6, where the method further comprises:

the processor, receiving a security code from the user in response to the notifying;

the processor, determining that the received security code is acceptable;

the processor identifying that the portable hard drive is in the permitted building;

the processor instructing the switching mechanism, through the transceiver, to restore power to the dual-purpose component; and the processor instructing the microcontroller to add the portable hard drive to the BIOS.

8. The method of claim 6, where the method further comprises:

the processor, receiving a security code from the user in response to the notifying;

the processor, determining that the received security code is acceptable;

the processor identifying that the portable hard drive remains outside the permitted building;

the processor instructing the switching mechanism, through the transceiver, to restore power to the dual-purpose component;

the processor instructing the microcontroller to add the portable hard drive to the BIOS; and the processor reconfiguring the firmware in the MRAM to reclassify the current location of the hard drive to be the permitted building.

9. The method of claim 6, where the method further comprises:

the processor, receiving a security code from the user in response to the notifying;

the processor, determining that the received security code is not acceptable;

the processor identifying that the portable hard drive remains outside the permitted building;

the processor instructing the switching mechanism, through the transceiver, to restore power to the dual-purpose component;

the processor instructing the microcontroller to remove power from the portable hard drive.

10. The method of claim 6, where the method further comprises:

the processor, receiving a security code from the user in response to the notifying;

the processor, determining that the received security code is not acceptable;

the processor identifying that the portable hard drive remains outside the permitted building;

the processor instructing the switching mechanism, through the transceiver, to restore power to the dual-purpose component;

the processor instructing the microcontroller to purge data stored on the portable hard drive.

11. A computer program product, comprising a computer-readable program code configured to be executed by a computer system hosting a Web site comprising a processor, a memory coupled to the processor, and a computer-readable hardware storage device coupled to the processor, the computer-readable storage device containing program code configured to be run by the processor via the memory to implement a method for securing a secured external computer storage device attached to a portable computer, where the secured external computer storage device comprises:

a portable hard drive, a circuit board onto which is mounted a dual-function component consisting of a magnetosensitive random access memory (MRAM) and a microcontroller, a wireless transceiver capable of bidirectional communications between the microcontroller and a processor hosting a Web site, where the Web site is configured to perform a method for securing the portable hard drive, a GPS capable of identifying whether hardware components of the secured external computer storage device are physically located in a permitted building, and firmware stored in the MRAM comprising instructions for securing the portable hard drive, and a switching mechanism that controls distribution of power to components of the storage device, where the switching mechanism is capable of only three disabling operations: disabling power to only the circuit board, disabling power only to all components of the storage device other than the circuit board, and disabling power to all components of the storage device, the method comprising:

the processor of the Web site receiving, through the transceiver, a notification that the GPS has determined that the portable hard drive is no longer in the permitted building;

the processor, in response to the receiving, notifying a user of the portable computer that the portable hard drive is no longer in the permitted building; and the processor, in response to determining that the portable hard drive remains outside the permitted building after the notifying, instructing the microcontroller to perform the following sequence of operations: disabling power, by means of the switching mechanism, to the hard drive but not to the dual-function component; directing the portable computer to reboot and request a security code; and, upon a failure to receive a desired security code, removing the device from a BIOS of the portable computer without restoring power to the portable hard drive and without purging data from the portable hard drive.

12. The computer program product of claim 11, where the method further comprises:

the processor, receiving a security code from the user in response to the notifying;

the processor, determining that the received security code is acceptable;

the processor identifying that the portable hard drive is in the permitted building;

the processor instructing the switching mechanism, through the transceiver, to restore power to the dual-purpose component; and the processor instructing the microcontroller to add the portable hard drive to the BIOS.

13. The computer program product of claim 11, where the method further comprises:

the processor, receiving a security code from the user in response to the notifying;

the processor, determining that the received security code is acceptable;

the processor identifying that the portable hard drive remains outside the permitted building;

the processor instructing the switching mechanism, through the transceiver, to restore power to the dual-purpose component;

the processor instructing the microcontroller to add the portable hard drive to the BIOS; and the processor reconfiguring the firmware in the MRAM to reclassify the current location of the hard drive to be the permitted building.

14. The computer program product of claim 11, where the method further comprises:

the processor, receiving a security code from the user in response to the notifying;

the processor, determining that the received security code is not acceptable;

the processor identifying that the portable hard drive remains outside the permitted building;

the processor instructing the switching mechanism, through the transceiver, to restore power to the dual-purpose component;

the processor instructing the microcontroller to remove power from the portable hard drive.

15. The computer program product of claim 11, where the method further comprises:

the processor, receiving a security code from the user in response to the notifying;

the processor, determining that the received security code is not acceptable;

the processor identifying that the portable hard drive remains outside the permitted building;

the processor instructing the switching mechanism, through the transceiver, to restore power to the dual-purpose component;

the processor instructing the microcontroller to purge data stored on the portable hard drive.

\* \* \* \* \*